US010359951B1

(12) United States Patent
Per et al.

(10) Patent No.: US 10,359,951 B1
(45) Date of Patent: Jul. 23, 2019

(54) SNAPSHOTLESS BACKUP

(71) Applicants: Yuri Per, Moscow Region (RU);
Maxim V. Lyadvinsky, Moscow (RU);
Serguei M. Beloussov, Costa Del Sol (SG); Dmitry Egorov, Moscow Region (RU); Alexey Borodin, Moscow (RU)

(72) Inventors: Yuri Per, Moscow Region (RU);
Maxim V. Lyadvinsky, Moscow (RU);
Serguei M. Beloussov, Costa Del Sol (SG); Dmitry Egorov, Moscow Region (RU); Alexey Borodin, Moscow (RU)

(73) Assignee: ACRONIS INTERNATIONAL GmbH (CH)

( * ) Notice: Subject to any disclaimer, the term of this patent is extended or adjusted under 35 U.S.C. 154(b) by 0 days.

(21) Appl. No.: 14/320,496

(22) Filed: Jun. 30, 2014

Related U.S. Application Data

(60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
*G06F 9/45* (2006.01)
*G06F 12/08* (2016.01)
*G06F 12/0808* (2016.01)
*G06F 12/0815* (2016.01)
*G06F 3/06* (2006.01)

(52) U.S. Cl.
CPC .......... *G06F 3/0619* (2013.01); *G06F 3/0647* (2013.01); *G06F 3/0664* (2013.01); *G06F 3/0673* (2013.01)

(58) Field of Classification Search
CPC ....... G06F 9/45558; G06F 2009/45579; G06F 3/067; G06F 9/45533
USPC ......................................................... 711/162
See application file for complete search history.

(56) References Cited

U.S. PATENT DOCUMENTS

| | | | |
|---|---|---|---|
| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |

(Continued)

*Primary Examiner* — Mohamed M Gebril
(74) *Attorney, Agent, or Firm* — K&L Gates LLP

(57) ABSTRACT

A method, computer program product, computing system, and system for snapshotless backup are described. The method may include receiving, via a backup agent, an indication of a virtual machine to be backed up in a backup archive file. The backup agent may run outside of the virtual machine. The virtual machine may be hosted by a virtualization host device. The method may further include identifying, via the backup agent, a virtual disk associated with the virtual machine indicated to be backed up. The method may also include tracking, via a virtualization host agent running on the virtualization host device outside the virtual machine, changes to the virtual disk associated with the virtual machine on a sector level basis. The method may additionally include reading the virtual disk and transmitting sectors from the virtual disk to the backup archive file on a first pass.

20 Claims, 5 Drawing Sheets

(56) References Cited

U.S. PATENT DOCUMENTS

| | | |
|---|---|---|
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 * | 10/2012 | Yeresov .............. G06F 11/1451 707/646 |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 9,152,638 B1 * | 10/2015 | Naftel ..................... G06F 16/11 |
| 2006/0225065 A1 | 10/2006 | Chandhok et al. |
| 2010/0011178 A1 | 1/2010 | Feathergill |
| 2012/0017114 A1 * | 1/2012 | Timashev ........... G06F 11/1469 714/15 |
| 2012/0210066 A1 * | 8/2012 | Joshi .................. G06F 12/0866 711/118 |
| 2014/0068183 A1 * | 3/2014 | Joshi .................. G06F 12/0866 711/114 |
| 2014/0115579 A1 * | 4/2014 | Kong ..................... G06F 3/0605 718/1 |

\* cited by examiner

SNAPSHOTLESS BACKUP

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: U.S. patent application entitled "Configuring Backup and Recovery Routines in a Cloud Environment" and having Ser. No. 14/320,393, filed on Jun. 30, 2014; U.S. patent application entitled "Using A Storage Path To Facilitate Disaster Recovery" and having Ser. No. 14/320,409, filed on Jun. 30, 2014; U.S. patent application entitled "Granular Recovery Using Hot-Plug Virtual Disks" and having Ser. No. 14/320,422, filed on Jun. 30, 2014; U.S. patent application entitled "Hot Recovery of Virtual Machines" and having Ser. No. 14/320,450, filed on Jun. 30, 2014; U.S. patent application entitled "Recovery of Virtual Machine Files Using Disk Attachment" and having Ser. No. 14/320,510, filed on Jun. 30, 2014; U.S. patent application entitled "Agentless File Backup of a Virtual Machine" and having Ser. No. 14/320,526, filed on Jun. 30, 2014; U.S. patent application entitled "Machine Replication" and having Ser. No. 14/320,540, filed on Jun. 30, 2014; U.S. patent application entitled "Data Backup Parallelization" and having Ser. No. 14/320,546, filed on Jun. 30, 2014; and U.S. patent application entitled "Systems and Methods for Backup of Virtual Machines" and having Ser. No. 14/320,555, filed on Jun. 30, 2014.

TECHNICAL FIELD

The technical field may generally relate to cloud computing, and more particularly to backup of virtual machines in a cloud environment.

BACKGROUND

Various business critical applications may be run on physical computing devices and/or virtual machines and thus it may be critical to create backups of such physical computing devices and/or virtual machines in case a failure or loss of data occurs. Backing up a physical computing device and/or virtual machine may consume valuable resources and may cause the physical computing device and/or virtual machine to run slower, and may affect services supported. For example, during some backup processes, write requests to the virtual machine being backed up may need to be written to a separate file and may use up valuable resources on the virtual machine. Accordingly, reducing the use of resources in a physical computing device and/or virtual machine during backup processes may be a primary goal in various business contexts.

BRIEF SUMMARY

In an embodiment, a method for snapshotless virtual machine backup may include receiving, via a backup agent, an indication of a virtual machine to be backed up in a backup archive file, the backup agent running outside of the virtual machine, the virtual machine hosted by a virtualization host device. The method may further include identifying, via the backup agent, a virtual disk associated with the virtual machine indicated to be backed up. The method may also include tracking, via a virtualization host agent running on the virtualization host device outside the virtual machine, changes to the virtual disk associated with the virtual machine on a sector level basis. The method may additionally include reading the virtual disk and transmitting sectors from the virtual disk to the backup archive file on a first pass. Moreover, the method may include storing a record of sectors of the virtual disk which changed after being read and transmitted on the first pass. The method may further include transmitting the sectors of the virtual disk which changed after being read and transmitted on the first pass to the backup archive file on a second pass.

One or more of the following features may be included. The method may include iteratively transmitting sectors of the virtual disk, which changed after being read and transmitted on a previous pass, to the backup archive on a next pass. The method may further include designating each sector of the virtual disk associated with the virtual machine as a sector-to-read before the first pass, wherein each sector-to-read is read from the virtual disk and transmitted to the backup archive file on the first pass. The method may also include designating sectors of the virtual disk which changed after being read and transmitted on the first pass as changed sectors, wherein the changed sectors are read from the virtual disk and transmitted to the backup archive file on the second pass. The tracking of changes to the virtual disk associated with the virtual machine on the sector level basis may be terminated in response to determining that no sector changed during the second pass. The sectors of the virtual disk associated with the virtual machine may be read using a file system driver installed on the virtualization host device. The backup agent may be installed on a computing device separate from the virtualization host device.

In an embodiment, a computer program product may reside on a computer readable storage medium and may have a plurality of instructions stored on it. When executed by a processor, the instructions may cause the processor to perform operations for snapshotless virtual machine backup. The operations may include receiving, via a backup agent, an indication of a virtual machine to be backed up in a backup archive file, the backup agent running outside of the virtual machine, the virtual machine hosted by a virtualization host device. The operations may further include identifying, via the backup agent, a virtual disk associated with the virtual machine indicated to be backed up. The operations may also include tracking, via a virtualization host agent running on the virtualization host device outside the virtual machine, changes to the virtual disk associated with the virtual machine on a sector level basis. The operations may additionally include reading the virtual disk and transmitting sectors from the virtual disk to the backup archive file on a first pass. Moreover, the operations may include storing a record of sectors of the virtual disk which changed after being read and transmitted on the first pass. The operations may further include transmitting the sectors of the virtual disk which changed after being read and transmitted on the first pass to the backup archive file on a second pass.

One or more of the following features may be included. The operations may include iteratively transmitting sectors of the virtual disk, which changed after being read and transmitted on a previous pass, to the backup archive on a next pass. The operations may further include designating each sector of the virtual disk associated with the virtual machine as a sector-to-read before the first pass, wherein each sector-to-read is read from the virtual disk and transmitted to the backup archive file on the first pass. The operations may also include designating sectors of the virtual disk which changed after being read and transmitted on the first pass as changed sectors, wherein the changed sectors are read from the virtual disk and transmitted to the backup archive file on the second pass. The tracking of changes to the virtual disk associated with the virtual machine on the sector level basis may be terminated in response to determining that no sector changed during the second pass. The sectors of the virtual disk associated with the virtual machine may be read using a file system driver installed on the virtualization host device. The backup agent may be installed on a computing device separate from the virtualization host device.

In an embodiment a computing system for snapshotless virtual machine backup may include one or more processors. The one or more processors may be configured to receive, via a backup agent, an indication of a virtual machine to be backed up in a backup archive file, the backup agent running outside of the virtual machine, the virtual machine hosted by a virtualization host device. The one or more processors may be further configured to identify, via the backup agent, a virtual disk associated with the virtual machine indicated to be backed up. The one or more processors may also be configured to track, via a virtualization host agent running on the virtualization host device outside the virtual machine, changes to the virtual disk associated with the virtual machine on a sector level basis. The one or more processors may additionally be configured to read the virtual disk and transmit sectors from the virtual disk to the backup archive file on a first pass. Moreover, the one or more processors may be configured to store a record of sectors of the virtual disk which changed after being read and transmitted on the first pass. The one or more processors may be further configured to transmit the sectors of the virtual disk which changed after being read and transmitted on the first pass to the backup archive file on a second pass.

One or more of the following features may be included. The one or more processors may be configured to iteratively transmit sectors of the virtual disk, which changed after being read and transmitted on a previous pass, to the backup archive on a next pass. The one or more processors may further be configured to designate each sector of the virtual disk associated with the virtual machine as a sector-to-read before the first pass, wherein each sector-to-read is read from the virtual disk and transmitted to the backup archive file on the first pass. The one or more processors may also be configured to designate sectors of the virtual disk which changed after being read and transmitted on the first pass as changed sectors, wherein the changed sectors are read from the virtual disk and transmitted to the backup archive file on the second pass. The tracking of changes to the virtual disk associated with the virtual machine on the sector level basis may be terminated in response to determining that no sector changed during the second pass. The sectors of the virtual disk associated with the virtual machine may be read using a file system driver installed on the virtualization host device. The backup agent may be installed on a computing device separate from the virtualization host device.

In an embodiment, a method for recovery of a virtual machine while keeping the virtual machine online may include receiving a selection indicating that a backup archive of a virtual machine is to be restored to a virtual disk at a virtual machine host server computer from a storage device. The backup archive may be one of a plurality of virtual machine backup archives at the storage device. Each virtual machine backup archive may represent a point-in-time of the virtual machine to be restored. The method may further include, in response to receiving the selection, initiating, with an agent that is in communication with the virtual machine host computer, a recovery process to transfer data, from the backup archive of a virtual machine to be restored, to a virtual disk at the virtual machine host computer. The method may also include, upon initiating the recovery process and before the virtual machine has been entirely restored from the backup archive, booting, from the virtual disk at the virtual machine host computer, the virtual machine to be restored. The method may additionally include, while the virtual machine is booting from the virtual disk and before the virtual machine has been entirely restored from the backup archive, intercepting, with a file system driver running on the virtual machine host computer, a read request from the virtual machine to the virtual disk at the virtual machine host computer.

Moreover, the method may include determining, with the agent that is in communication with the virtual machine host computer, if the read request from the virtual machine requested data from the virtual disk which has not yet been restored from the backup archive to the virtual disk by the recovery process because the virtual machine has not been entirely restored from the backup archive. The method may further include, in response to determining that the requested data has not yet been restored from the backup archive to the virtual disk, restoring, out of order, the requested data from the backup archive to the virtual disk before the virtual machine has been entirely restored from the backup archive. The method may also include reading, from the virtual disk at the virtual machine host computer, the requested data before the virtual machine has been entirely restored from the backup archive.

In an embodiment, a system for snapshotless virtual machine backup may include a virtualization host device hosting one or more virtual machines having one or more associated virtual disks on which the one or more virtual machines are stored. The system may also include a backup agent which receives an indication of at least one of the one or more virtual machines to be backed up in a backup archive file, the backup agent running outside of the at least one virtual machine indicated to be backed up. The system may further include a virtualization host agent, running on the virtualization host device outside the virtual machine, which tracks changes to a virtual disk associated with the at least one virtual machine on a sector level basis and reads the virtual disk and transmits sectors from the virtual disk to the backup archive file on a first pass. The system may additionally include a storage device which stores a record of sectors of the virtual disk which changed after being read and transmitted on the first pass. Moreover, the virtualization host agent transmits the sectors of the virtual disk which changed after being read and transmitted on the first pass to the backup archive file on a second pass.

In an embodiment, a method for computing device backup may include receiving, via a backup agent, an indication of a computing device to be backed up in a backup archive file, the backup agent running outside of the computing device. The method may further include identifying, via the backup agent, a disk associated with the computing device indicated to be backed up. The method may also include tracking, via a tracking agent running outside the computing device, changes to the disk associated with the computing device on a sector level basis. The method may additionally include reading the disk and transmitting sectors from the disk to the backup archive file on a first pass. Moreover, the method may include storing a record of sectors of the disk which changed after being read and transmitted on the first pass. The method may further include transmitting the sectors of the disk which changed after being read and transmitted on the first pass to the backup archive file on a second pass.

The details of one or more implementations are set forth in the accompanying drawings and the description below. Other features and advantages will become apparent from the description, the drawings, and the claims.

DETAILED DESCRIPTION

Overview

Figure 1:
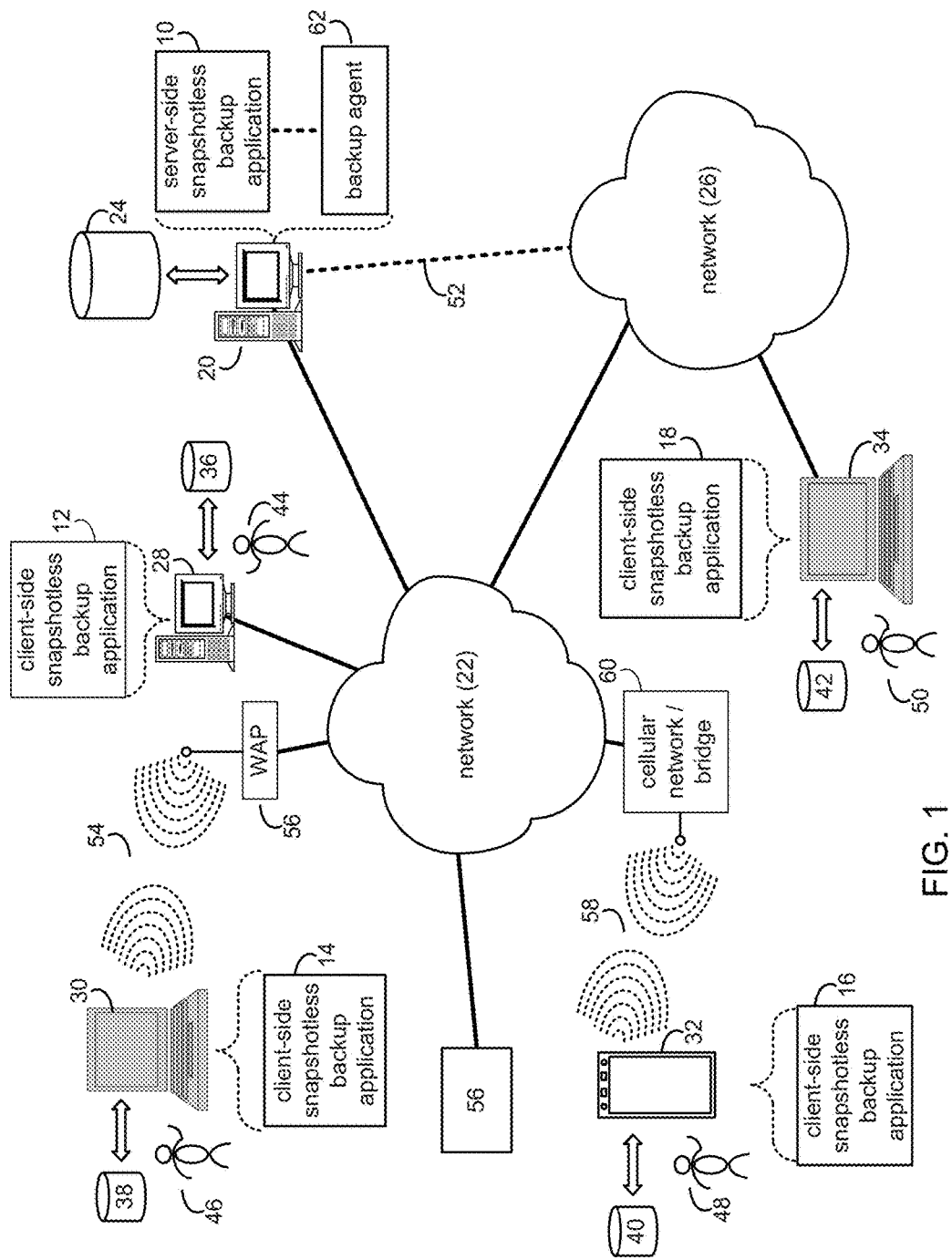
FIG. 1 depicts an example system that can execute implementations of the present disclosure.

A cloud provider may institute backup and recovery procedures to ensure persistence of a tenant's applications, data, or other resources accessed through one or more virtual machines ("VM"). For example, a backup archive of the VM may be created and stored onsite or offsite and may include the entire content of the VM before it failed. Efficient recovery of VMs may be critical for proper business operations of the cloud provider as the tenant's application demands are likely to continue in the event of a VM failure.

Depending on the applications it is running and the transactions it is performing, a given VM's state changes overtime. Virtualization software includes features by which snapshots can be taken of the VM to capture its state at a point in time. The snapshot records the state of the VM so that it can be reverted to at a later time. The snapshot can include the state of the disks or other storage associated with the VM and other state features such as whether it is on, off, or suspended. A VM snapshot may be used as a checkpoint for the VM. The snapshot is created for a point in time and all subsequent write operations are then sent to memory storage such as a virtual disk associated with the VM. To revert back to the checkpoint in time, the VM state is read from the snapshot and the other writes which are backed up to memory storage are also read. In some virtualization software platforms only one active snapshot is possible with each snapshot replacing any prior snapshot. Snapshots have various uses, such as a way to have a VM state to return to prior to testing some potentially unstable applications on the VM.

In some situations, a snapshot feature may be used to create a backup of the VM. The snapshot feature may halt any changes to a virtual disk (i.e., the virtual disk that stores all the VM contents) such that the virtual disk may be copied for backup. Any changes attempted to be made to the virtual disk while the virtual disk is being copied for backup may be written to a snapshot file. Thus, the virtual disk can be backed up during a time when its content does not change. Copying the virtual disk may be time consuming and it may be necessary to keep the snapshot file alive during the entire backup. As such, performance of the VM may be affected during the backup.

Further, as the snapshot is kept alive for the whole duration of the backup, the snapshot file may grow and consume significant resources, such as space on a datastore that supports the virtual machine, and additional storage space may become necessary. Also, deleting the snapshot after backup may take significant time and may also consume hardware resources and affect VM performance.

For example, many resources of a virtualization host device that may host the VM may be consumed while deleting or consolidating snapshots because additional CPU and RAM usage may be necessary. In an embodiment, the disclosure relates to a snapshotless backup process by which snapshots are not generated, but instead changes to disk sectors used by the VM undergoing a backup are tracked and migrated to an archive that includes data storage. This data storage is not actively used by the VM during its operation in an embodiment. In an implementation, the snapshotless backup process described herein may eliminate the necessity to consolidate or delete a snapshot because changed data is tracked but not written to any additional virtual disk. Thus, because consolidation is not required, additional virtualization host resources may not be consumed.

In some situations, an agent may be installed in a guest operating system (OS) of the VM to facilitate the backup process. Installing an agent in the guest (OS) of the VM may also affect VM performance and negatively impact services provided by the VM Thus, using snapshot or guest OS agent to create a backup may ultimately slow the VM down and negatively impact the services provided by the VM. The VM may become unresponsive during snapshot deletion or consolidation and may cause VM services to malfunction. Because may backup solutions are based on snapshot features, there may be a need for a system that reduces a snapshot file's lifetime or eliminates the need for the snapshot during backup. Further, there may be a need for a system that does not use a guest OS agent to facilitate backup. In various implementations, the techniques and features described in the present disclosure are directed towards systems and methods for snapshotless VM backup which may allow for better performance and resource usage during VM backups. The techniques and features described herein may also be implemented without use of a guest OS agent to facilitate backup. Further, in various implementations, the techniques and features described in the present disclosure are also directed towards systems and methods for snapshotless backup of physical computers (computing devices) which may allow for better performance and resource usage during physical computer backups.

Figure 2:
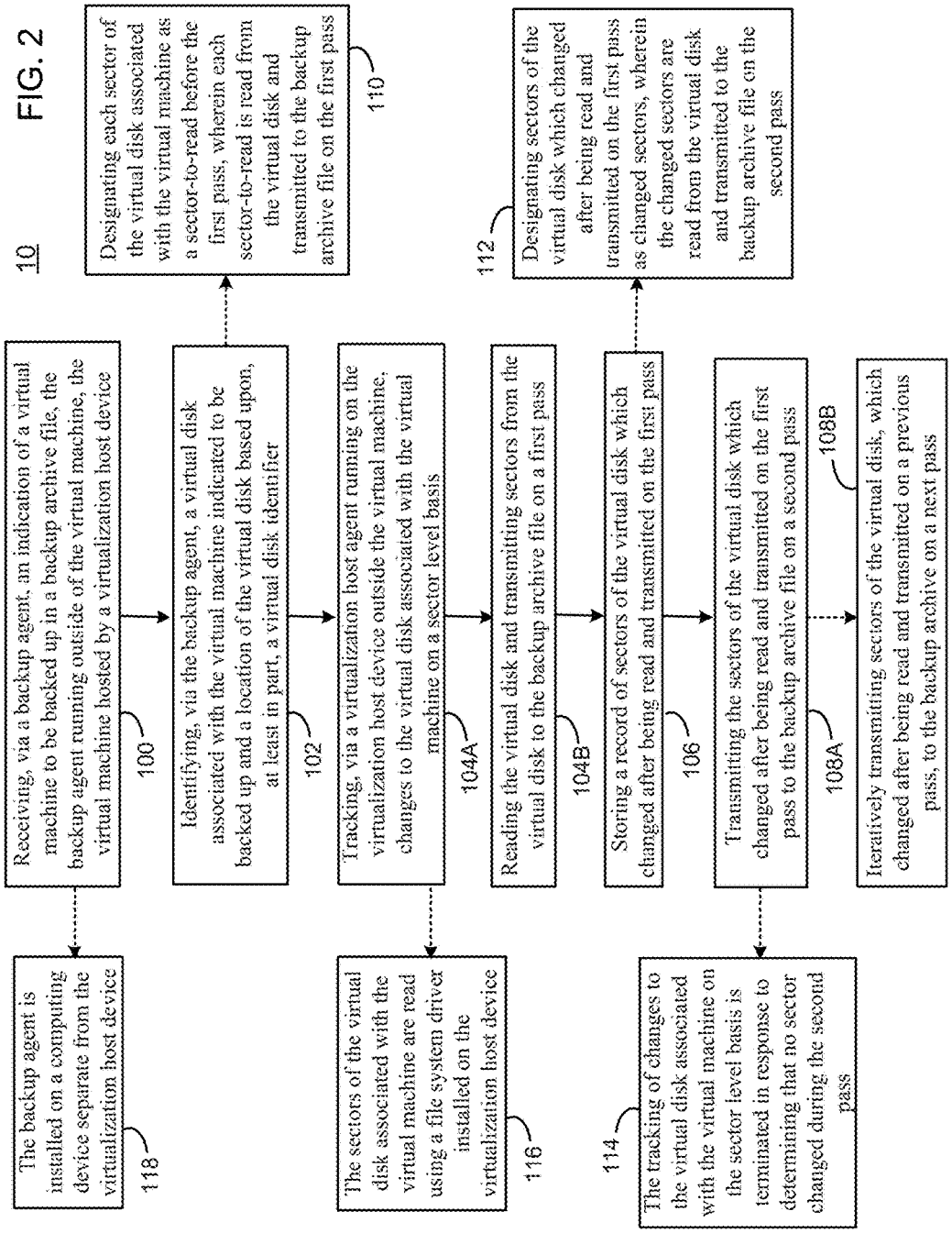
FIG. 2 is a flowchart illustrating an example process for snapshotless virtual machine backup in accordance with the present disclosure.

Referring to FIGS. 1 & 2, there is shown a server-side snapshotless backup application 10 and client-side snapshotless backup applications 12, 14, 16, and 18. Server-side snapshotless backup application 10 and/or one or more of client-side snapshotless backup applications 12, 14, 16, and/or 18 may execute one or more processes configured to carry out one or more of the features described herein. Server-side snapshotless backup application 10 may be referred to as a process configured to carry out one or more of the features described herein, such as snapshotless backup process 10. Further, one or more of client-side snapshotless backup applications 12, 14, 16, and 18 may be referred to as a process configured to carry out one or more of the features described herein, such as snapshotless backup processes 12, 14, 16, and/or 18.

As will be discussed below, snapshotless backup process 10 may receive 100 via a backup agent, an indication of a virtual machine to be backed up in a backup archive file. The backup agent may run outside of the virtual machine. The virtual machine may be hosted by a virtualization host device. Snapshotless backup process 10 may also identify 102 (306) via the backup agent, a virtual disk associated with the virtual machine indicated to be backed up (i.e., the source VM). Snapshotless backup process 10 may also identify a location of the virtual disk. The location of the virtual disk may be based upon, at least in part, a virtual disk identifier. Snapshotless backup process 10 may further track 104A via a virtualization host agent running on the virtualization host device outside the virtual machine, changes to the virtual disk associated with the virtual machine on a sector level basis. Snapshotless backup process 10 may also read 104B the virtual disk and transmit sectors from the virtual disk to the backup archive file on a first pass. Snapshotless backup process 10 may additionally store 106 a record of sectors of the virtual disk which changed after being read and transmitted on the first pass. Moreover, snapshotless backup process 10 may transmit 108 the sectors of the virtual disk which changed after being read and transmitted on the first pass to the backup archive file on a second pass.

The snapshotless backup process may be a server-side process (e.g., server-side snapshotless backup process 10), a client-side process (e.g., client-side snapshotless backup process 12, client-side snapshotless backup process 14, client-side snapshotless backup process 16, or client-side snapshotless backup process 18), or a hybrid server-side/client-side process (e.g., a combination of server-side snapshotless backup process 10 and one or more of client-side snapshotless backup processes 12, 14, 16, 18).

System Overview

Referring to FIG. 1, server-side snapshotless backup process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side snapshotless backup process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side snapshotless backup processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side snapshotless backup processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side snapshotless backup processes 12, 14, 16, 18 and/or server-side snapshotless backup process 10 may be processes that run within (i.e., are part of) a cloud computing site, cloud computing application, cloud platform, or cloud environment. Alternatively, client-side snapshotless backup processes 12, 14, 16, 18 and/or server-side snapshotless backup process 10 may be stand-alone applications that work in conjunction with the cloud computing site, cloud computing application, cloud platform, or cloud environment. One or more of client-side snapshotless backup processes 12, 14, 16, 18 and server-side snapshotless backup process 10 may interface with each other (via network 22 and/or network 26).

Users 44, 46, 48, 50 may access server-side snapshotless backup process 10 directly through the device on which the client-side snapshotless backup process (e.g., client-side snapshotless backup processes 12, 14, 16, 18) is executed, namely client electronic devices 28, 30, 32, 34, for example. Users 44, 46, 48, 50 may access server-side snapshotless backup process 10 directly through network 22 and/or through secondary network 26. Further, server computer 20 (i.e., the computer that executes server-side snapshotless backup process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Snapshotless Backup Process

For the following discussion, server-side snapshotless backup process 10 will be described for illustrative purposes. It should be noted that server-side snapshotless backup process 10 may interact with client-side snapshotless backup process 12 and may be executed within one or more applications that allow for communication with client-side snapshotless backup process 12. However, this is not intended to be a limitation of this disclosure, as other configurations are possible (e.g., stand-alone, client-side snapshotless backup processes and/or stand-alone server-side snapshotless backup processes). For example, some implementations may include one or more of client-side snapshotless backup processes 12, 14, 16, 18 in place of or in addition to server-side snapshotless backup process 10.

The systems and methods (e.g., snapshotless backup process 10) described herein relate to the backup of data in a virtualized environment. In part, the systems and methods relate to decreasing or eliminating the time period for keeping a snapshot of a virtual machine while it is being backed up. The techniques and features described herein may reduce the backup time period for the VM or decrease or eliminate the time during which services supported by the VM are unavailable or negatively impacted during a VM backup when compared to using a snapshot feature or a guest OS agent.

The systems described herein may include one or more memory elements for backup of software and databases, virtual machines, and computer storage products including instructions to be executed by a processor to cause the processor to implement the methods described herein. The systems described herein may also include a backup archive, where the VM backup file, backup archive file, or backup contents may be located; the backup archive may be disposed in a memory, a portion of a memory, or across one or more memories.

Referring now to FIG. 1, one or more of users 44, 46, 48, and 50 may be cloud administrators at a cloud provider or may be cloud end-users. The cloud administrators may access and administer cloud a computing site and the cloud-end users may access and interact with the cloud computing site through one or more of client electronic devices 28, 30, 32, 34 (respectively). The cloud computing site may run a cloud or virtualization application such as VMWare™ or may include bare-metal embedded hypervisors (e.g., VMware™ ESX™ and VMware™ ESXi™) that may run directly on server hardware at cloud computing site 20. Further, the cloud computing site may include a vCloud™ architecture that may enhance cooperation between hypervisors.

Figure 3:
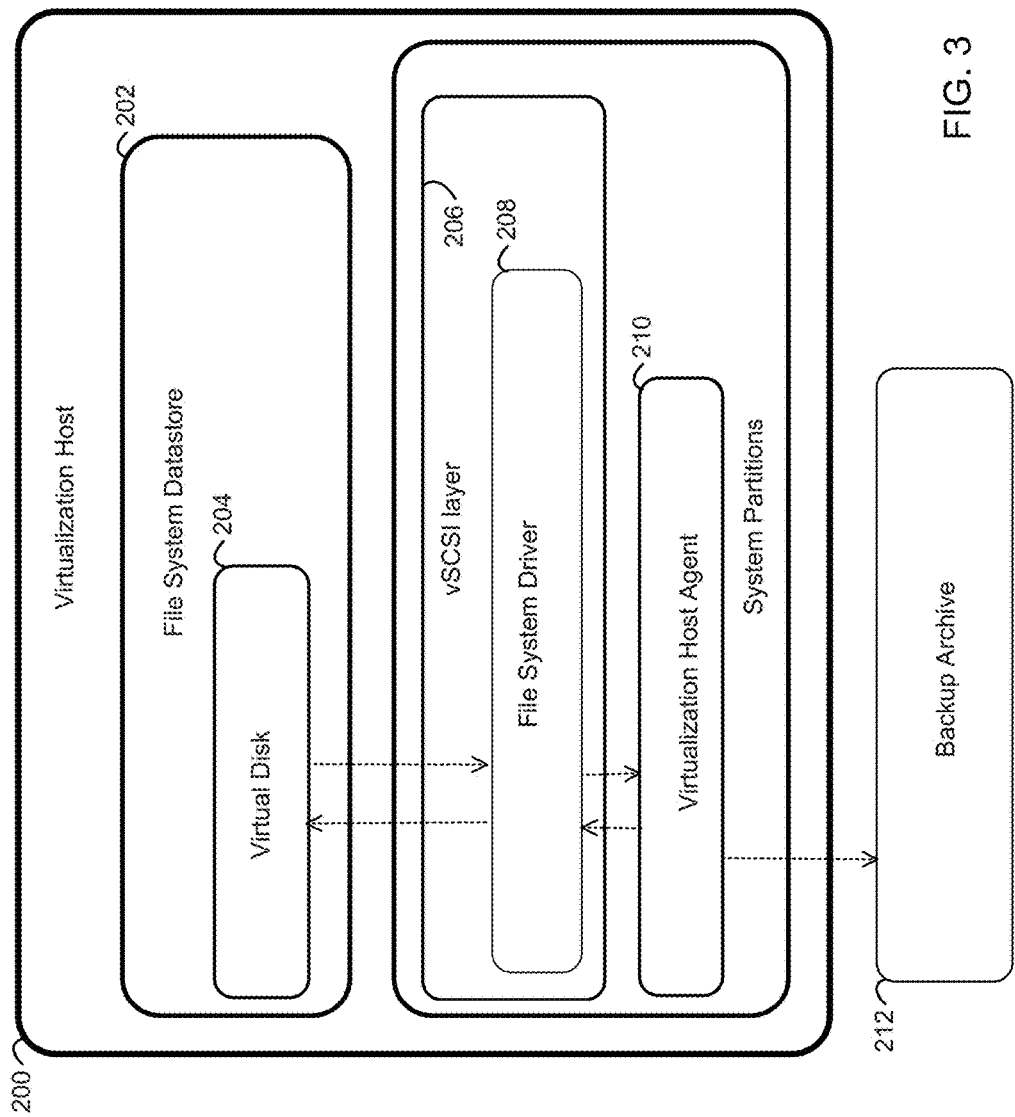
FIG. 3 depicts an example infrastructure in accordance with the present disclosure.

Referring now to FIG. 3, the cloud computing site may include one or more virtualization host machines such as virtualization host 200 (e.g., a virtual machine host computer). Virtualization host 200 may be a server computer on which a hypervisor runs one or more virtual machines. Virtualization host 200 may be an ESXi host and may run the VMware™ ESXi™ hypervisor. Virtualization host 200 may use a cluster file system such as Virtual Machine File System (VMFS) or a Network File System (NFS).

For example, virtualization host 200 may include file system datastore 202, which may be based on VMFS. Datastore 202 may include one or more virtual disks such as virtual disk 204, which may be a virtual machine disk (VMDK or .vmdk) file. Virtual disk 204 may be a single disk file including the constituent data for an entire virtual machine. File system datastore 202 may be a logical representation of the storage provided by virtualization host 200. Physically, file system datastore 202 may be located on a non-virtual SCSI device in communication with virtualization host 200.

Virtualization host 200 may also include a virtual small computer system interface layer (vSCSI layer 206). vSCSI layer 206 may be a subsystem of virtualization host 200 which may enable running a vSCSI filter or file system driver on virtualization host 200. For example, file system driver 208 may be implemented with vSCSI layer 206 and may be configured to act as a transport layer to send (non-virtual) SCSI data to a virtual machine (VM). The VM can then act or operate on the SCSI data and can capture read and write operations sent through the vSCSI file system driver. File system driver 208 may be installed (302) into virtualization host device 200 (e.g., into a service console).

Small computer system interface or (SCSI) may be a standard that defines how computers can communicate with other devices, such as printers, scanners, and storage devices. By using SCSI, computers can send and receive information to and from other SCSI devices. Similarly, a vSCSI layer such as vSCSI layer 206 may enable a virtual machine to communicate with SCSI devices. For example, vSCSI layer 206 may allow a virtual machine running on virtualization host 200 to communicate with backup archive 212, which may reside on a SCSI device such as a physical storage disk or drive.

File system driver 208 may be a low-level file system driver or vSCSI filter which may act as a transport layer to send SCSI data to a VM. The VM may then act or operate on the SCSI data. File system driver 208 may be installed on virtualization host 200 (e.g., on vSCSI layer 206) and may allow for high performance reading and writing of SCSI blocks (i.e., data) from virtual disk 204, which may be locked. File system driver 208 may be configured to capture input, output, read, or write requests to and from virtual disk 204. File system driver 208 may be installed into virtualization host 200 on vSCSI layer 206. Further, File system driver 208 may be configured to emulate vSCSI controllers for virtual machines and may work with VMFS partitions and .vmdk files or disks thereon.

Virtualization host 200 may include or be in communication with one or more agents. For example, virtualization host 200 may have one or more agents installed on it, such as virtualization host agent 210. The virtualization host agent 210 may be implemented as a hypervisor agent. The hypervisor agent may run as a service in the virtualization host 200. The virtualization host agent or hypervisor agent may exchange information comprising permissions that allow reading of virtual disks accessible via virtualization host 200. Virtualization host agent 210 may allow interaction between the file system driver and tracks of the changed sectors (e.g., like a proxy between the file system driver backup agent).

Figure 4:
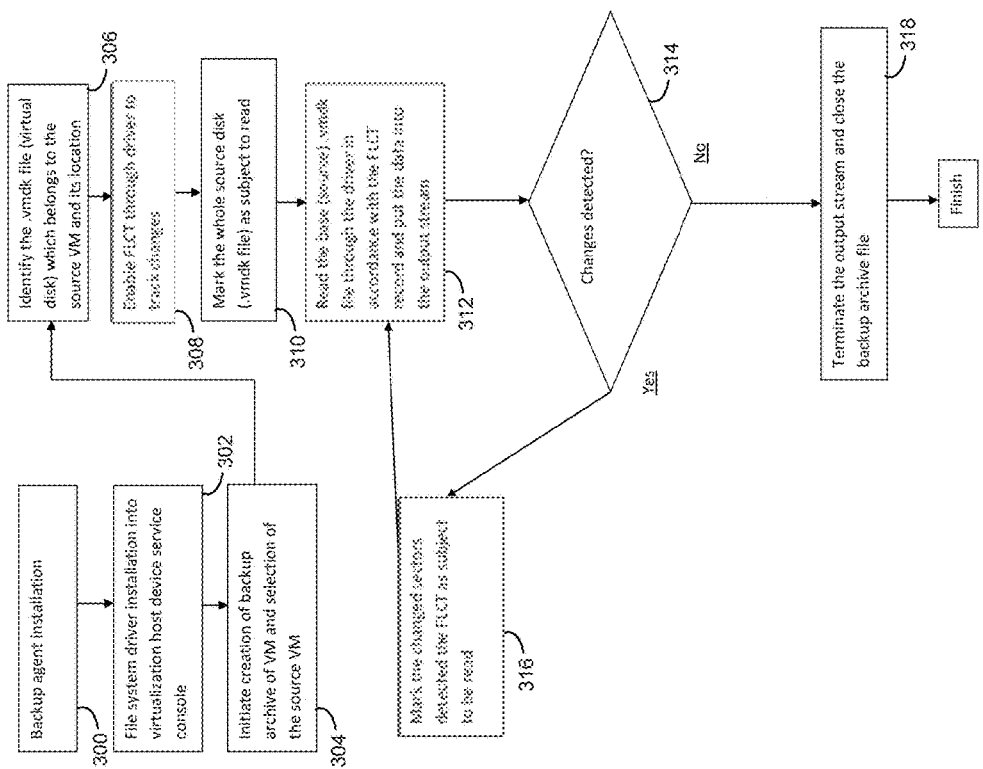
FIG. 4 is a flowchart illustrating an example process for snapshotless virtual machine backup in accordance with the present disclosure.

Further, virtualization host agent 210 may be in communication with a backup agent (e.g., backup agent 62). Backup agent 62 may reside and/or run on server computer 20 and together with virtualization host agent 210 may carry our one or more features of snapshotless backup process 10. Referring now also to FIG. 4, in an embodiment, both virtualization host agent 210 and backup agent 62 may be installed (300) on virtualization host 200 and/or may be combined into one agent configured to carry out the techniques and features of snapshotless backup process 10. Virtualization host agent 210 and backup agent 62 may be in communication with file system driver 208.

Virtualization host agent 210 and/or backup agent 62 may include software component, executable code, function, subroutine, or other set of instructions designed to carry out one or more operations for snapshotless backup of one or more virtual machines running on virtualization host 200. Virtualization host agent 210 and/or backup agent 62 may run on virtualization host 200 as a virtual appliance. Additionally, virtualization host 200 may be in communication with backup archive 212, which may include virtual machine backup data or backup archive files of one or more virtual machines running on virtualization host 200. Backup archive 212 may reside on a physical or virtual storage device. In an embodiment, virtualization host agent 210 and/or backup agent 62 may include one or more executables which handle interaction and coordination between the backup archive 212, virtualization host 200, file system driver 208, and a user (through, for example, a web interface). For example, backup agent 62, which may run on server computer 20, may receive one or more inputs which may be one or more commands from an end-user (entered via, e.g., a web interface accessed at one or more of client electronic devices 28, 30, 32, or 34). Further, backup 62 agent may output commands which may be transmitted to one or more of virtualization host 200, virtualization host agent 210, file system driver 208, and backup archive 212.

One or more agents (e.g., virtualization host agent 210, backup agent 62, or a combination of both) may coordinate the snapshotless backup process. Backup agent 62 may require a separate machine where it can be run. This machine may be, for example, a virtual appliance, a Windows/Linux virtual machine, or a Windows/Linux physical machine, where the executable code of backup agent 62 can be executed. Backup agent 62 may generally be active during the whole snapshotless backup procedure. Backup agent 62 may generally be in communication with virtualization host 200 throughout the snapshotless backup process (e.g., snapshotless backup process 10).

Referring now also to FIG. 2, snapshotless backup process 10 may receive 100 via backup agent 62, an indication of a virtual machine to be backed up in a backup archive file (e.g., to reside in backup archive 212). The backup archive file may be created (304) by snapshotless backup process 10 in response to receiving the indication. Backup agent 62 may be installed (118) or may run outside of the virtual machine (e.g., at server computer 20) and outside virtualization host device 20. The virtual machine may be hosted by virtualization host device 200. Virtualization host device 200 may be a source pre-configured ESX(i) host which may host one or more virtual machines that at some point may need to be backed up. The indication of the virtual machine to be backed up may be received from, e.g., a user entering a command into a web interface at server computer 20 or one or more of client electronic devices 28, 30, 32, or 34. For example, one or more of users 44, 46, 48, and 50 may be system administrators of a cloud computing site and may wish to backup one or more virtual machines hosted by virtualization host device 200.

Figure 5:
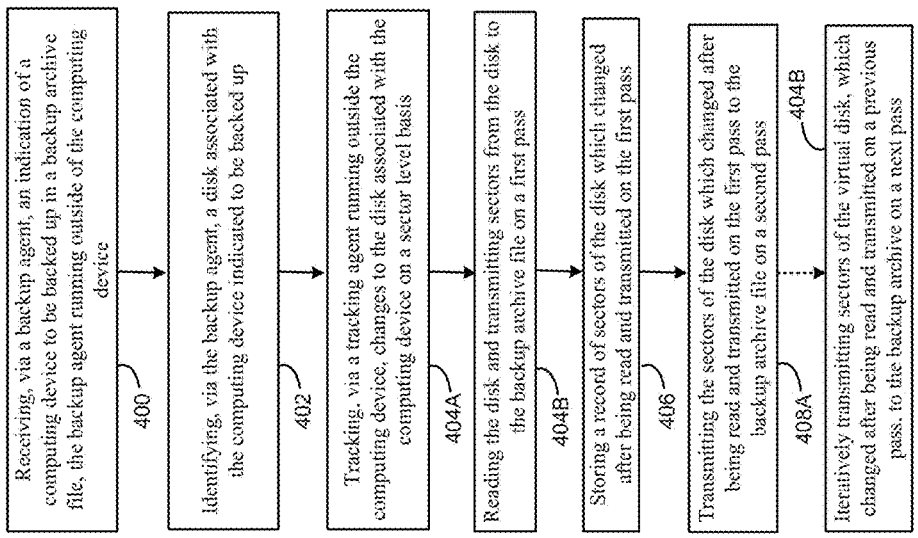
FIG. 5 is a flowchart illustrating an example process for physical machine backup in accordance with the present disclosure.

As discussed above, snapshotless backup process 10 may also include features to backup physical machines. Snapshotless backup process 10, when backing up physical machines, may operate similarly to the way it does when backing up virtual machines. Referring now also to FIG. 5, for a physical computer (computing device) backup, snapshotless backup process 10 may receive 400, via a backup agent, an indication of a computing device to be backed up in a backup archive file. The backup agent may run outside of the computing device.

In an embodiment, in response to receiving the indication or selection (304) of the virtual machine to be backed up (i.e., the source virtual machine), backup agent 62 may initiate snapshotless backup process 10. Snapshotless backup process 10 may identify 102 via backup agent 62, virtual disk 204 which may be associated with the virtual machine indicated to be backed up. Snapshotless backup process 10 may also identify a location of virtual disk 204. The location may be based upon, at least in part, a virtual disk identifier. Virtual disk 204 may include the contents of the virtual machine to be backed up. In some situations, the contents of the virtual machine to be backed up may be stored on multiple virtual disks may need to be backed up in order to entirely backup the virtual machine. Virtual disk 204 may be identified by connection or by uniform resource identifier (URI). A virtual disk URI may include a VM URI and slot. Identification of the location of .vmdk disk files (in, e.g., file system datastore 202) which store the contents of the virtual machine to be backed up may be based on a VM identifier and virtual disk number identifier (e.g., scsi0:1). For example, the virtual disk URI may be "<guid>:scsi0:1", where "0" may correspond to a SCSI adapter connected to the virtual machine and "1" may correspond to a SCSI channel to which the particular VM disk is attached. In an implementation, there may be 4 SCSI adapters with up to 15 virtual disks for each. Referring now also to FIG. 5, for a physical computer (computing device) backup, snapshotless backup process 10 may identify 402, via the backup agent, a disk associated with the computing device indicated to be backed up.

Further, snapshotless backup process 10 may track 104A via virtualization host agent 210 running on virtualization host device 200 outside the virtual machine, changes to virtual disk 204 associated with the virtual machine on a sector level basis. Snapshotless backup process 10 may also read 104B virtual disk 204 and transmit sectors from virtual disk 204 to the backup archive file (e.g., residing in backup archive 212) on a first pass. Virtualization host agent 210 may be installed on virtualization host device 200 and may run as a service. Further, in an embodiment snapshotless backup process 10 may track 104A via virtualization host agent 210 running on virtualization host device 200 outside the virtual machine, changes to virtual disk 204 associated with the virtual machine on a sector level basis while reading 104B virtual disk 204 and transmitting sectors from virtual disk 204 to the backup archive file (e.g., residing in backup archive 212) on the first pass.

For example, on the first pass, snapshotless backup process 10 (via e.g., virtualization host agent 210) may start tracking changes to virtual disk 204 (i.e., the .vmdk file contents) at the sector level while virtual disk 204 is read. Snapshotless backup process 10 may include and/or enable (308) a file-level changes tracker (FLCT) feature which may determine which sectors of virtual disk 204 have changed. The FLCT may determine which sectors changed since the backup process started or may determine which sectors have been in use since the backup process started. If any sectors have change since the backup or process started, the FLCT may tag these sectors and store a list of these sectors in a file. Further, the FLCT may be implemented on a file-system driver level (e.g., file system driver 208). When a sector of a VM disk is changed during VM operations, an identification (ID) of the changed sector may be kept by file system driver 208. This ID may be used to identify the sectors which need to be read.

Referring now also to FIG. 5, for a physical computer backup, snapshotless backup process 10 may track 404A, via a tracking agent running outside the computing device, changes to the disk associated with the computing device on a sector level basis. The tracking agent may operate similarly to virtualization host agent 210. Further, snapshotless backup process 10 may read 404B the disk and may transmit sectors from the disk to the backup archive file on a first pass. Also, in an embodiment, snapshotless backup process 10 may track 404A, via the tracking agent running outside the computing device, changes to the disk associated with the computing device on a sector level basis while reading 404B the disk and transmitting sectors from the disk to the backup archive file on the first pass.

Virtualization host agent 210 may be in communication with file system driver 208 and may determine from file system driver 208 which virtual disk (.vmdk disk file) it should track and provide changes for. Each change to the virtual disk (e.g., virtual disk 204) may be considered an event, and virtualization host agent 210 may be configured to track those events.

In an embodiment, snapshotless backup process 10 may designate 110 or mark (310) each sector of virtual disk 204 (i.e., .vmdk disk file) associated with the virtual machine (i.e., source VM) as a sector-to-read before the first pass. Each sector-to-read may be read from virtual disk 204 and transmitted to the backup archive file (e.g., residing in backup archive 212) on the first pass. For example, to flag each sector to indicate to snapshotless backup process 10 that the sector should be read on the first pass, snapshotless backup process 10 may mark the entire .vmdk disk file (i.e., virtual disk 204) as "changed" in a FLCT record. As a result snapshotless backup process 10 may read each sector of virtual disk 204 on the first pass.

The sectors of virtual disk 204 associated with the virtual machine (i.e., the virtual machine to be backed up) may be read 116 (312) using file system driver 208 installed on virtualization host device 200. For example, file system driver 208 may be a low-level file system driver installed into an ESX(i) configuration onto vSCSI layer 206 using a collection of files put together in an archive for distribution. For example a vSphere Installation Bundle (VIB) may include a file archive, an XML descriptor file, and a signature file to facilitate installation.

File system driver 208 may be in communication with virtualization host agent 210 and may enable virtualization host agent 210 to read the .vmdk disk files located in file system datastore 202 of virtualization host device 200. For example, the .vmdk disk files, which may be locked when the corresponding virtual machine boots, may be opened for read/write access via file system driver 208. Virtualization host agent 210 may read the .vmdk disk file corresponding to the virtual machine to be backed up and forward the read data into an output stream.

In other words, the source VM .vmdk disk file may be read (312) in accordance with the FLCT record and the corresponding data may be placed in an output stream. The output stream may be placed in a backup file (e.g., residing in backup archive 212). In an embodiment, the output stream may be placed in a different .vmdk disk file.

Snapshotless backup process 10 may (via, e.g., virtualization host agent 210) continue to read each sector designated as a sector-to-read until each sector of virtual disk 204 has been processed and the first pass is finished. In the first pass, virtual disk 204 may be read from beginning to end.

In an embodiment, snapshotless backup process 10 (via, e.g., virtualization host agent 210) may pull limited areas from a current pass and collect changes for the next pass at the same time if they are behind, or drop them. For example, while the first pass is performed, a list of sectors changed on the VM disk during the first pass may be created. The whole VM disk may not be tracked at this time and only the part of the VM disk which had been read until this time may be tracked. For example reading of the VM disk may start from sector 0 and may move to sector 100, and a change may occur in sector 50. Sector 50 may be marked by the FLCT as changed. At the same or near the same time, a change may occur in sector 200, which may be ahead of where the read operation is. Sector 200 may not be tracked and may not be marked by the FLCT because the read operation is not at this sector yet accordingly it does not make sense to track changes of this sector at this particular time, because this sector will be read later. In an embodiment, all sectors from the whole VM disk during each pass may be tracked.

Further, snapshotless backup process 10 may store 106 a record of sectors of virtual disk 204 which changed after being read and transmitted on the first pass. Because the reading of sectors during the first pass may begin at the first sector of virtual disk 304, the changes made to sectors which have not yet been processed on the first pass may be discarded. In other words only the sectors which changed after being read in the first pass are added to the storage record. A list of sectors of virtual disk 204 (i.e., .vmdk disk file) which changed while virtual disk 204 was read during the first pass may be retrieved by snapshotless backup process 10 (e.g., via virtualization host agent 210). Snapshotless backup process 10 may also designate 112 sectors of virtual disk 204 which changed after being read and transmitted on the first pass as changed sectors. In other words, snapshotless backup process 10 may mark (316) the changed sectors as sectors-to-read. The changed sectors may be read from virtual disk 204 and transmitted to the backup archive file (e.g., residing in backup archive 212) on the second pass. Referring now also to FIG. 5, for a physical machine backup, snapshotless backup process 10 may store 406 a record of sectors of the disk (associated with a computing device indicated to be backed up) which changed after being read and transmitted on the first pass.

Snapshotless backup process 10 may transmit 108 the sectors of virtual disk 204 which changed after being read and transmitted on the first pass to the backup archive file (e.g., residing in backup archive 212) on a second pass. Snapshotless backup process 10 may continue this cycle to a third, fourth, or fifth pass and so on. In this way, snapshotless backup process 10 may iteratively transmit 108B sectors of the virtual disk, which changed after being read and transmitted on a previous pass, to the backup archive on a next pass. The previous pass may be, for example, the third pass, and the next pass may be, for example, the fourth pass. During any pass, if there are no changes tracked or if it is determined that no changes occurred (314), the result may be a crash-consistent copy of the virtual machine. Virtualization host agent 210 may then stop looking for changes on virtual disk 204 from file system driver 208. For example, the tracking of changes to virtual disk 204 associated with the virtual machine (i.e., the virtual machine to be backed up) on the sector level basis may be terminated (114) in response to determining that no sector changed during the second pass. The output stream may be terminated (318) and the backup archive file or target .vmdk disk file to which the virtual machine backup data was transmitted may be closed.

In an implementation, referring now also to FIG. 5, for a physical machine backup, snapshotless backup process 10 may transmit 408A the sectors of the disk (associated with the computing device indicated to be backed up) which changed after being read and transmitted on the first pass to the backup archive file on a second pass. Snapshotless backup process 10 may continue this cycle to a third, fourth, or fifth pass and so on. In this way, similar to the operations for a virtual machine backup as described above, snapshotless backup process 10 may (for a physical computer backup) iteratively transmit 404B sectors of the virtual disk, which changed after being read and transmitted on a previous pass, to the backup archive on a next pass. During any pass, if there are no changes tracked or if it is determined that no changes occurred, the result may be a crash-consistent copy of the physical machine.

Example Software and Hardware Related Implementations

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for snapshotless virtual machine backup comprising:
   receiving, via a backup agent comprising a user interface, an indication of a virtual machine to be backed up in a backup archive file, the backup agent running outside of the virtual machine, the virtual machine hosted by a virtualization host device, wherein a file system driver is installed on the virtualization host device;
   identifying, via the backup agent, a virtual disk associated with the virtual machine indicated to be backed up;
   tracking, via a virtualization host agent running on the virtualization host device outside the virtual machine, changes to the virtual disk associated with the virtual machine on a sector level basis;
   reading a first set of sectors of the virtual disk, using the file system driver, wherein the file system driver is in communication with the virtualization host agent, wherein the first set of sectors are read by the file system driver when virtual disk is locked;
   transmitting, using the virtualization host agent, the first set of sectors from the locked virtual disk to the backup archive file on a first pass;
   storing a record of sectors of the virtual disk which changed after being read and transmitted on the first pass; and
   transmitting, using the virtualization host agent, the sectors of the virtual disk which changed after being read and transmitted on the first pass to the backup archive file on a second pass, wherein foregoing steps are performed without creating a snapshot within the virtual machine to be backed up.

2. The method of claim 1, further comprising:
   iteratively transmitting sectors of the virtual disk, which changed after being read and transmitted on a previous pass, to the backup archive on a next pass.

3. The method of claim 1, further comprising:
   designating each sector of the virtual disk associated with the virtual machine as a sector-to-read before the first pass, wherein each sector-to-read is read from the virtual disk and transmitted to the backup archive file on the first pass; and
   designating sectors of the virtual disk which changed after being read and transmitted on the first pass as changed sectors, wherein the changed sectors are read from the virtual disk and transmitted to the backup archive file on the second pass.

4. The method of claim 1, wherein the tracking of changes to the virtual disk associated with the virtual machine on the sector level basis is terminated in response to determining that no sector changed during the second pass, wherein the virtual disk is read from beginning to end during the first pass.

5. The method of claim 1, wherein the file system driver is a virtual small computer system interface (vSCSI) filter.

6. The method of claim 1, wherein the vSCSI filter is configured to act as a transport layer to send (non-virtual) SCSI data to the virtual machine.

7. A computer program product residing on a non-transitory computer readable storage medium having a plurality of instructions stored thereon, which, when executed by a processor, cause the processor to perform operations for snapshotless virtual machine backup, the operations comprising:
   receiving, via a backup agent comprising a user interface, an indication of a virtual machine to be backed up in a backup archive file, the backup agent running outside of the virtual machine, the virtual machine hosted by a virtualization host device, wherein a file system driver is installed on the virtualization host device;
   identifying, via the backup agent, a virtual disk associated with the virtual machine indicated to be backed up;
   tracking, via a virtualization host agent running on the virtualization host device outside the virtual machine, changes to the virtual disk associated with the virtual machine on a sector level basis;
   reading a first set of sectors of the virtual disk, using the file system driver, wherein the file system driver is in communication with the virtualization host agent, wherein the first set of sectors are read by the file system driver when virtual disk is locked or when the sectors are in use;
   transmitting, using the virtualization host agent, the first set of sectors from the locked or in use virtual disk to the backup archive file on a first pass;
   storing a record of sectors of the virtual disk which changed after being read and transmitted on the first pass; and
   transmitting the sectors of the virtual disk which changed after being read and transmitted on the first pass to the backup archive file on a second pass, wherein foregoing operations are performed without creating a snapshot within the virtual machine to be backed up.

8. The computer program product of claim 7, wherein the operations further comprise:
   iteratively transmitting sectors of the virtual disk, which changed after being read and transmitted on a previous pass, to the backup archive on a next pass.

9. The computer program product of claim 7, wherein the operations further comprise:
   designating each sector of the virtual disk associated with the virtual machine as a sector-to-read before the first pass, wherein each sector-to-read is read from the virtual disk and transmitted to the backup archive file on the first pass; and
   designating sectors of the virtual disk which changed after being read and transmitted on the first pass as changed sectors, wherein the changed sectors are read from the virtual disk and transmitted to the backup archive file on the second pass.

10. The computer program product of claim 7, wherein the tracking of changes to the virtual disk associated with the virtual machine on the sector level basis is terminated in response to determining that no sector changed during the second pass, wherein the virtual disk is read from beginning to end during the first pass.

11. The computer program product of claim 7, wherein the file system driver is a virtual small computer system interface (vSCSI) filter.

12. The computer program product of claim 7, wherein the vSCSI filter is configured to act as a transport layer to send (non-virtual) SCSI data to the virtual machine.

13. A computing system for snapshotless virtual machine backup, the computing system comprising one or more processors, wherein the one or more processors are configured to:
   receive, via a backup agent, an indication of a virtual machine to be backed up in a backup archive file, the backup agent running outside of the virtual machine, the virtual machine hosted by a virtualization host device, wherein a file system driver is installed on the virtualization host device;
   identify, via the backup agent, a virtual disk comprising a first set of sectors associated with the virtual machine indicated to be backed up;
   track, via a virtualization host agent running on the virtualization host device outside the virtual machine, changes to the virtual disk associated with the virtual machine on a sector level basis;
   read the first set of sectors, using the file system driver, wherein the file system driver is in communication with the virtualization host agent, wherein the first set of sectors are read by the file system driver when virtual disk is locked or when the sectors are in use;
   transmit, using the virtualization host agent, the first set of sectors from the locked or in use virtual disk to the backup archive file on a first pass;
   store a record of sectors of the virtual disk which changed after being read and transmitted on the first pass; and
   transmit the sectors of the virtual disk which changed after being read and transmitted on the first pass to the backup archive file on a second pass, wherein foregoing steps are performed without creating a snapshot within the virtual machine to be backed up.

14. The computing system of claim 13, wherein the one or more processors are further configured to:
   iteratively transmit sectors of the virtual disk, which changed after being read and transmitted on a previous pass, to the backup archive on a next pass.

15. The computing system of claim 13, wherein the one or more processors are further configured to:
   designate each sector of the virtual disk associated with the virtual machine as a sector-to-read before the first pass, wherein each sector-to-read is read from the virtual disk and transmitted to the backup archive file on the first pass; and
   designate sectors of the virtual disk which changed after being read and transmitted on the first pass as changed sectors, wherein the changed sectors are read from the virtual disk and transmitted to the backup archive file on the second pass.

16. The computing system of claim 13, wherein the tracking of changes to the virtual disk associated with the virtual machine on the sector level basis is terminated in response to determining that no sector changed during the second pass, wherein the virtual disk is read from beginning to end during the first pass.

17. The computing system of claim 13, wherein the file system driver is a virtual small computer system interface (vSCSI) filter.

18. The computing system of claim 15, wherein the first pass is performed while the virtual machine is running and wherein the second pass tracks changes made during the first pass.

19. A system for snapshotless virtual machine backup comprising:
- a virtualization host device hosting one or more virtual machines having one or more associated virtual disks on which the one or more virtual machines are stored, wherein a file system driver is installed on the virtualization host device;
- a backup agent comprising a user interface, wherein the backup agent receives an indication of the one or more virtual machines to be backed up in a backup archive file, the backup agent running outside of the one or more virtual machine indicated to be backed up;
- a virtualization host agent, running on the virtualization host device outside the one or more virtual machines, which tracks changes to a virtual disk using the file system driver, the virtual disk associated with at least one virtual machine of the one or more virtual machines, wherein the virtualization host agent tracks the virtual disk on a sector level basis, reads the virtual disk and transmits a first set of sectors from the virtual disk to the backup archive file on a first pass, wherein the file system driver is in communication with the virtualization host agent;
- a storage device which stores a record of the first set of sectors of the virtual disk which changed after being read and transmitted on the first pass, wherein operations of backup agent, virtualization host agent, and storage device are performed without creating a snapshot within the virtual machine to be backed up; and
- wherein the virtualization host agent transmits sectors of the virtual disk which changed after being read and transmitted on the first pass to the backup archive file on a second pass.

20. A method for computing device backup comprising:
- receiving, via a backup agent comprising a user interface, an indication of a computing device to be backed up in a backup archive file, the backup agent running outside of the computing device, wherein a file system driver is installed on the computing device;
- identifying, via the backup agent, a disk associated with the computing device indicated to be backed up;
- tracking, via a tracking agent running outside the computing device, changes to the disk associated with the computing device on a sector level basis;
- reading a first set of sectors of the disk, using the file system driver and transmitting the first set of sectors from the disk to the backup archive file on a first pass, wherein the file system driver is in communication with the tracking agent, wherein the first set of sectors are read by the file system driver when virtual disk is locked or in use;
- storing a record of sectors of the disk which changed after being read and transmitted on the first pass; and
- transmitting the sectors of the disk which changed after being read and transmitted on the first pass to the backup archive file on a second pass, wherein foregoing steps are performed without creating a snapshot within the virtual machine to be backed up.

* * * * *